I. Reamer,
Corn Harvester.
No. 22583.  Patented Jan. 11, 1859.
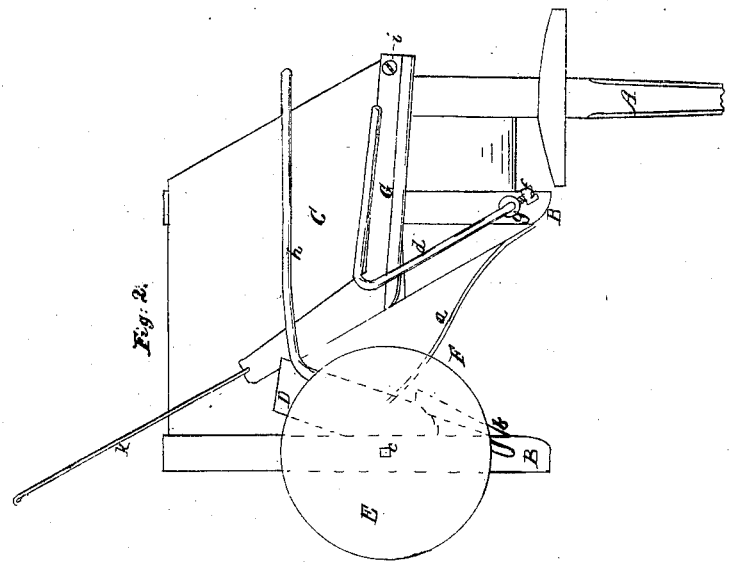
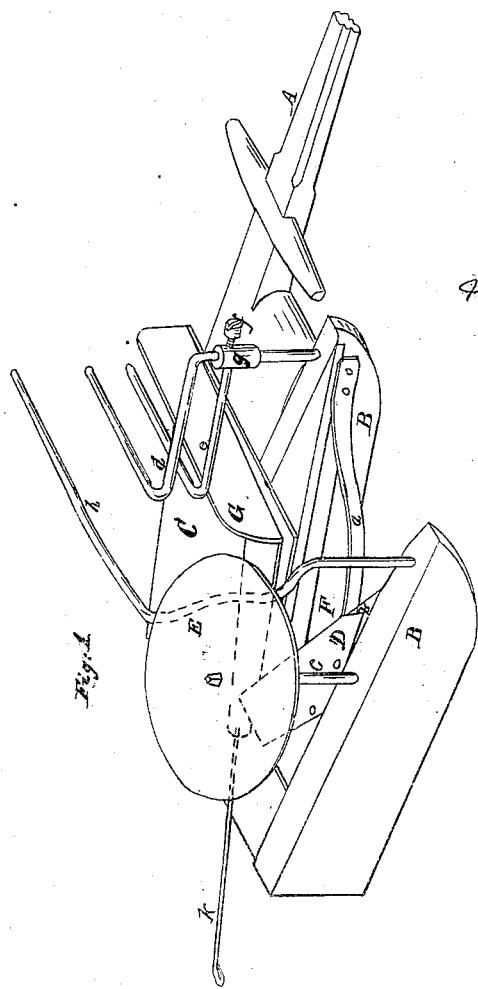
Isaac Reamer
Witnesses

UNITED STATES PATENT OFFICE.

ISAAC REAMER, OF CONRAD'S STORE, VIRGINIA.

IMPROVEMENT IN CORN-HARVESTERS.

Specification forming part of Letters Patent No. 22,583, dated January 11, 1859.

*To all whom it may concern:*

Be it known that I, ISAAC REAMER, of Conrad's Store, in the county of Rockingham and State of Virginia, have invented a new and useful Improvement in Corn-Harvesters, of which the following is a full, clear, and exact description, reference being had to the accompanying drawings, which form part of this specification, and in which—

Figure 1 represents a perspective view of a corn-harvester constructed according to my improvement, and Fig. 2 a top view or plan of the same.

Similar letters of reference indicate corresponding parts in both figures of the drawings.

The nature of my invention consists in a novel construction and arrangement of guides or ways to conduct the corn to the reel, and otherwise assist in directing the run and hold of the machine traveling on sliding runners against the corn; also, in a novel arrangement of a sweeping clearer for discharging the cut corn from off the platform.

To enable others skilled in machines of this class to make and use my improvement, I now proceed minutely to describe it.

In the accompanying drawings, A is the draft bar or pole, arranged on one side of the machine, which is here shown to slide on runners B at a suitable distance apart, and made bowing upward in front. These runners are arranged under the platform C of the machine, in front of which they project, and are connected by cross and diagonal braces, constituting the frame-work of the machine. Between the runners, and formed, it may be said, by the connecting diagonal braces which contract backwardly, is a taper-shaped space for the corn to enter the machine. One side of this space is provided with a spring-guide, *a*, secured in front, and the other side may have a short rigid guide, *b*, immediately in advance of the cutter D, which obliquely faces the spring-guide *a*, but is higher than it, said cutter occupying somewhat of an elevated position, and being arranged to cut obliquely upward, as well as set in direction of its length to give a drawing cut, and preferably made elastic.

On the cutter side of the machine is erected a perpendicular shaft, *c*, carrying at its top a horizontal wheel or reel, E, arranged to overhang the corn-receiving space E at a suitable height above the cutter and mainly in advance of the cutter. This reel is so disposed as to have free rotation on its axis, and is designed to be rotated by the friction of the cornstalks in passing it. On the opposite side of the corn-receiving space are comparatively rigid guides *d e*, arranged to occupy an elevated position, and designed to act in concert with the spring-guide *a* below them. These rigid guides *d e* are situated one above the other, and are set to direct the corn in toward the reel, and in their rear are bent at right angles to and toward the line of draft. One or both of said guides are made adjustable to vary their altitude. In the drawings, the lower one, *e*, only is shown thus adjustable by means of a set-screw, *f*, and sliding socket *g*, connecting it to the shank which sustains the upper guide, *d*. The altitute of said adjustable guide *e* is varied to suit different heights of corn, and by means of its socket-connection with the shank of the upper guide it may also be more or less turned to vary its obliquity toward the reel and cutter. Parallel, or thereabout, to the bent back extensions of these two last-described guides, in rear of them, is an additional guide, *h*.

A clearer, G, is pivoted to the platform at a point, *i*, in front on the draft side to sweep across the platform in a curvilinear direction, and discharge the cut corn at the side of the machine. This clearer may be operated by a rod, *k*, attached to its front swinging ends, and be actuated by hand or otherwise to clear the platform of cut corn at suitable intervals.

The machine being set in motion, the guides *c, d,* and *e* will serve materially by the action of the stalks against them, to keep the machine in a proper course on its runners and hold it fair to its work. The lower guide on the draft side of the recess F being elastic, a comparatively easy guiding-pressure will be exerted below, where the cornstalks are less pliable, and thus the draft will be eased, while the rigid guides *d e* above will act more positively and firmly on the yielding upper portions of the stalks, and the several guides serve to direct the corn up against the reel E, which, freely turning by the friction of the stalks against it, eases the corn from retarding pressure on the cutter side, facilitates the passage of the corn to the cutter D, and insures the cut corn falling straight between the rear guide, $h$, and the bent extensions of the raised front guides, $d\ e$, for the clearer to effect its easy removal, as before described; and here it may be observed that the elevated rigid guide $e$, having both its altitude and obliquity variable, the pressure on the stalks in the passage of the corn to the reel admits of every requisite regulation; also that the rigid upper guides, acting in concert with a spring-guide below, a guiding-pressure is induced corresponding with the difference of pliability in the stalks above and below.

What I claim as my invention, and desire to secure by Letters Patent, is—

1. The combination of the elastic lower guide, $a$, with the adjustable upper rigid guide, $e$, when these parts are arranged for joint operation in the manner described, for the purpose specified.

2. The arrangement and combination of guide $h$ and swinging clearer G, for removing the corn from the platform in the manner described.

The above specification of my improvement in corn-harvesters signed by me this 14th day of October, 1858.

ISAAC REAMER.

Witnesses:
WM. C. COFFMAN,
JOHN SUTHARD.